United States Patent
Ko

(10) Patent No.: US 9,610,952 B2
(45) Date of Patent: Apr. 4, 2017

(54) APPARATUS AND METHOD FOR CONTROLLING CREEP TORQUE OF A VEHICLE

(71) Applicant: Hyundai Motor Company, Seoul (KR)

(72) Inventor: Kyu Beom Ko, Incheon (KR)

(73) Assignee: Hyundai Motor Company, Seoul (KR)

( * ) Notice: Subject to any disclaimer, the term of this patent is extended or adjusted under 35 U.S.C. 154(b) by 5 days.

(21) Appl. No.: 14/554,137

(22) Filed: Nov. 26, 2014

(65) Prior Publication Data

US 2016/0068162 A1 Mar. 10, 2016

(30) Foreign Application Priority Data

Sep. 5, 2014 (KR) .................. 10-2014-0119079

(51) Int. Cl.
| | |
|---|---|
| G06F 7/70 | (2006.01) |
| G06F 19/00 | (2011.01) |
| G06G 7/00 | (2006.01) |
| G06G 7/76 | (2006.01) |
| B60W 30/18 | (2012.01) |
| B60W 10/02 | (2006.01) |
| B60W 10/06 | (2006.01) |
| B60W 10/08 | (2006.01) |
| B60W 20/13 | (2016.01) |
| B60W 20/14 | (2016.01) |
| B60W 50/00 | (2006.01) |

(52) U.S. Cl.
CPC ...... *B60W 30/18127* (2013.01); *B60W 10/02* (2013.01); *B60W 10/06* (2013.01); *B60W 10/08* (2013.01); *B60W 20/13* (2016.01); *B60W 20/14* (2016.01); *B60W 30/18027* (2013.01); *B60W 30/18063* (2013.01); *B60W 2050/0026* (2013.01); *B60W 2050/0089* (2013.01); *Y02T 10/6286* (2013.01)

(58) Field of Classification Search
CPC ................................................ B60W 30/18127
See application file for complete search history.

(56) References Cited

U.S. PATENT DOCUMENTS

| | | | |
|---|---|---|---|
| 2003/0225501 A1 | 12/2003 | De La Salle et al. | |
| 2010/0004809 A1* | 1/2010 | Itoh | B60K 6/445 701/22 |
| 2010/0235043 A1* | 9/2010 | Seta | B60L 3/0038 701/29.2 |
| 2013/0288855 A1 | 10/2013 | Monsere | |

FOREIGN PATENT DOCUMENTS

| | | |
|---|---|---|
| JP | 2008-154394 A | 7/2008 |
| JP | 2012-090442 A | 5/2012 |
| KR | 10-2009-0014826 A | 2/2009 |
| KR | 10-2010-0057370 | 5/2010 |
| KR | 10-2012-0080720 A | 7/2012 |

* cited by examiner

*Primary Examiner* — Imran Mustafa
(74) *Attorney, Agent, or Firm* — Mintz Levin Cohn Ferris Glovsky and Popeo, P.C.; Peter F. Corless

(57) ABSTRACT

An apparatus for controlling a creep torque of a vehicle includes: a driving system configured to deliver power to one or more wheels equipped in a vehicle; and a control unit configured to i) determine a driving mode of the vehicle, ii) calculate a creep torque based on a regenerative braking ratio of the vehicle while driving for a threshold time, and iii) control the driving system based on the calculated creep torque to convert the driving mode.

15 Claims, 2 Drawing Sheets

APPARATUS AND METHOD FOR CONTROLLING CREEP TORQUE OF A VEHICLE

CROSS-REFERENCE TO RELATED APPLICATION

This application claims the benefit of and priority to Korean Patent Application No. 10-2014-0119079, filed on Sep. 5, 2014 in the Korean Intellectual Property Office, the disclosure of which is incorporated herein in its entirety by reference.

TECHNICAL FIELD

The present disclosure relates to an apparatus and a method for controlling a creep torque of a vehicle, and more particularly, to an apparatus and a method for controlling a creep torque of a vehicle which confirm a regenerative braking ratio of the vehicle and control the creep torque of the vehicle according to the confirmed regenerative braking ratio.

BACKGROUND

Recently, environmental concerns have caused a rapid increase in the development of "green" vehicles. A typical green vehicle is driven by electric power generated by a motor or power of an engine, depending on the driver's preference, and a power state of a battery in the vehicle.

Generally, when the driver frequently steps on the gas or brake pedals of a green vehicle, as described above, frequent acceleration and deceleration of the vehicle results, thereby increasing oil pressure usage and reducing fuel efficiency.

SUMMARY

The present disclosure has been made to solve the above-mentioned problems occurring in the related art while advantages achieved by the related art are maintained intact.

An aspect of the present disclosure provides an apparatus and a method for controlling a creep torque of a vehicle capable of calculating a regenerative braking ratio based on the driving of the vehicle for a threshold time and of controlling the creep torque according to the calculated regenerative braking ratio.

According to embodiments of the present disclosure, an apparatus for controlling a creep torque of a vehicle includes: a driving system configured to deliver power to one or more wheels equipped in a vehicle; and a control unit configured to i) determine a driving mode of the vehicle, ii) calculate a creep torque based on a regenerative braking ratio of the driving vehicle while driving for a threshold time, and iii) control the driving system based on the calculated creep torque to convert the driving mode.

The control unit may set a first torque map correction factor having a large creep torque and a second torque map correction factor having a small creep torque, respectively, to be 0.5 according to the driving mode when the vehicle is started.

The control unit may compare the regenerative braking ratio to a maximum regenerative braking ratio and to a minimum regenerative braking ratio and change the first torque map correction factor and the second torque map correction factor based on the comparison.

The control unit may change the first torque map correction factor to 0 and the second torque map correction factor to 1, when the regenerative braking ratio is larger than the maximum regenerative braking ratio.

The control unit may change the first torque map correction factor to 1 and the second torque map correction factor to 0, when the regenerative braking ratio is smaller than the minimum regenerative braking ratio.

The control unit may change the first torque map correction factor to 1−(the regenerative braking ratio−the minimum regenerative braking ratio)/(the maximum regenerative braking ratio−the minimum regenerative braking ratio) and change the second torque map correction factor to (the regenerative braking ratio−the minimum regenerative braking ratio)/(the maximum regenerative braking ratio−the minimum regenerative braking ratio), when the regenerative braking ratio is smaller than the maximum regenerative braking ratio and larger than the minimum regenerative braking ratio.

The control unit may periodically calculate the creep torque based on the changed first torque map correction factor and the changed second torque map correction factor.

The control unit may confirm the regenerative braking ratio periodically or in real time and update the creep torque based on the regenerative braking ratio.

Further, the vehicle may be a green vehicle.

According to embodiments of the present disclosure, a method for controlling a creep torque of a vehicle includes: determining a driving mode of a vehicle; calculating a regenerative braking ratio of the vehicle while driving for a threshold time; calculating a creep torque based on the calculated regenerative braking ratio; and converting the driving mode of the vehicle based on the calculated creep torque.

The method may further include: prior to the calculating of the regenerative braking ratio, setting a first torque map correction factor having a large creep torque and a second torque map correction factor having a small creep torque, respectively, to be 0.5 according to the driving mode when the vehicle is started.

The calculating of the creep torque may further include: comparing the regenerative braking ratio to a maximum regenerative braking ratio and a minimum regenerative braking ratio and changing the first torque map correction factor and the second torque map correction factor based on the comparison, wherein the creep torque may be calculated based on the changed first torque map correction factor and the changed second torque map correction factor.

In the changing of the first torque map correction factor and the second torque map correction factor, the first torque map correction factor may be changed to 0 and the second torque map correction factor may be changed to 1, when the regenerative braking ratio is larger than the maximum regenerative braking ratio.

In the changing of the first torque map correction factor and the second torque map correction factor, the first torque map correction factor may be changed to 1 and the second torque map correction factor may be changed to 0, when the regenerative braking ratio is smaller than the minimum regenerative braking ratio.

In the changing of the first torque map correction factor and the second torque map correction factor, the first torque map correction factor may be changed to 1−(the regenerative braking ratio−the minimum regenerative braking ratio)/(the maximum regenerative braking ratio−the minimum regenerative braking ratio), and the second torque map correction factor may be changed to (the regenerative braking ratio−the minimum regenerative braking ratio)/(the maximum regenerative braking ratio−the minimum regenerative braking ratio), when the regenerative braking ratio is smaller than the maximum regenerative braking ratio and larger than the minimum regenerative braking ratio.

Further, the vehicle may be a green vehicle.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
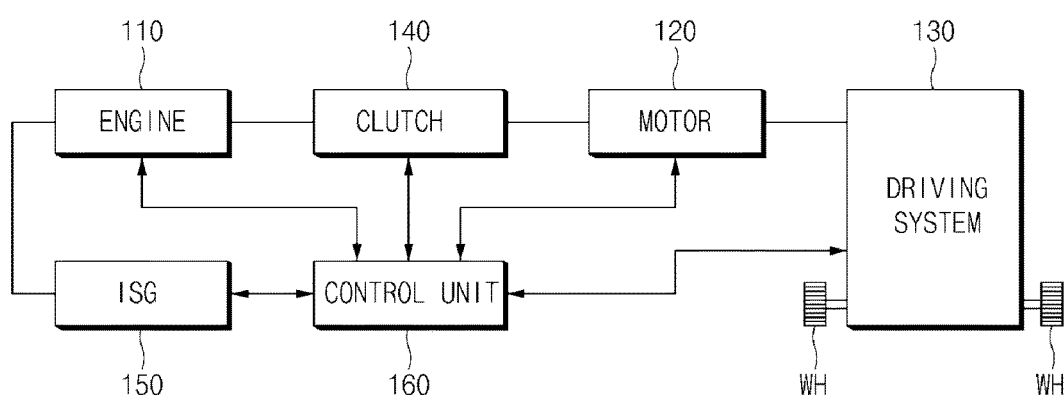
FIG. 1 is a block diagram illustrating a main configuration of an apparatus for controlling a creep torque according to embodiments of the present disclosure.

Hereinafter, various embodiments of the present disclosure will be described with reference to the accompanying drawings. The embodiments of the present disclosure may be variously changed and variously practiced, but specific embodiments are illustrated in the accompanying drawings and detailed contents thereof will be described. However, it is to be understood that various embodiments of the present disclosure are not limited to the specific embodiments, but include all modifications, and/or equivalents, and substitutions included in the spirit and the scope of the present disclosure. In describing the drawings, like components are denoted by like reference numerals.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles. Notably, the term "green vehicle" is primarily used throughout the present disclosure. However, the teachings described herein are applicable to any type of vehicle, not just green vehicles, and therefore, the scope of the present disclosure is not limited only to green vehicles.

Additionally, it is understood that one or more of the below methods, or aspects thereof, may be executed by at least one control unit. The term "control unit" may refer to a hardware device that includes a memory and a processor. The memory is configured to store program instructions, and the processor is configured to execute the program instructions to perform one or more processes which are described further below. Moreover, it is understood that the below methods may be executed by an apparatus comprising the control unit, whereby the apparatus is known in the art to be suitable for controlling a creep torque of a vehicle.

Furthermore, the control unit of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

FIG. 1 is a block diagram illustrating a main configuration of an apparatus for controlling a creep torque according to embodiments of the present disclosure.

Referring to FIG. 1, an apparatus 100 for controlling a creep torque according to embodiments of the present disclosure may include an engine 110, a motor 120, a driving system 130 configured to shift a driving force of the engine 110 and the motor 120 and transfer or interrupt the shifted driving force to at least one wheel WH, a clutch 140 configured to be disposed between the engine 110 and the motor 120 and to engage (e.g., couple) or disengage the engine 110 with or from the motor 120, an integrated starter & generator (ISG) 150 configured to actuate the engine 110 or generate power, and a control unit 160 configured to appropriately perform a driving control process on the engine 110, the motor 120, the driving system 130, the clutch 140, and the ISG 150 under situations which meet particular conditions and to check states thereof to control the creep torque, as described in further detail below. The engine 110, the motor 120, the driving system 130, the clutch 140, and the ISG 150 are components which are generally equipped in the vehicle using an automatic driving system and therefore the detailed description thereof will be omitted.

The control unit 160 may confirm a driving mode of a vehicle (e.g., a green vehicle or otherwise) and calculate the creep torque based on a regenerative braking ratio of the vehicle when it is being driven for a threshold time. The control unit 160 may convert the driving mode of the vehicle based on the calculated creep torque by receiving a control request from the driving system 130. The driving mode of the vehicle (particularly with respect to a hybrid or green vehicle) may represent, for example, a mode in which the vehicle is driven using electric power generated by an electric motor or a mode in which the vehicle is driven using power generated by an engine.

When it is sensed that the vehicle has been started, the control unit 160 may set a first torque map correction factor ($K_D$) and a second torque map correction factor ($K_E$), respectively, to be 0.5 based on the driving mode of the vehicle. The control unit 160 may calculate a current creep torque of the vehicle using the following defined Equation 1.

$$K_D * C_D + K_E * C_E = C_N \quad \text{[Equation 1]}$$

$K_D$ which is the first torque map correction factor represents a correction factor value of a torque map having a small creep torque, $K_E$ which is the second torque map represents a correction factor value of a torque map having a large creep torque, $C_D$ is a creep torque depending on a driving speed of a vehicle in the torque map having the small creep torque, and $C_E$ represents a creep torque based on the driving speed of the vehicle in the torque map having the large creep torque.

When the generation of acceleration and deceleration of the vehicle is periodically sensed, the control unit 160 may calculate the regenerative braking ratio ($R_{R/D}$) for the threshold time. In this case, the regenerative braking ratio ($R_{R/D}$) may be a ratio of regenerative energy to driving energy. The regenerative braking ratio ($R_{R/D}$) may be continuously updated at a threshold time interval.

According to embodiments of the present disclosure, the control unit 160 may confirm whether the calculated regenerative braking ratio ($R_{R/D}$) has a larger value than a maximum regenerative braking ratio ($R_{max}$). When the regenerative braking ratio ($R_{R/D}$) has a larger value than the maximum regenerative braking ratio ($R_{max}$), the control unit 160 may change the first torque map correction factor ($K_D$) to 0 and change the second torque map correction factor ($K_E$) to 1. The control unit 160 may substitute the changed first torque map correction factor ($K_D$) and second torque map correction factor ($K_E$) into the above Equation 1 to calculate a new creep torque. The control unit 160 controls the driving system 130 to convert the calculated creep torque into a new creep torque at the time of starting on of the vehicle so as to be able to convert a driving mode.

According to embodiments of the present disclosure, the control unit 160 may confirm whether the calculated regenerative braking ratio ($R_{R/D}$) has a smaller value than a minimum regenerative braking ratio ($R_{min}$). When the regenerative braking ratio ($R_{R/D}$) has a smaller value than the minimum regenerative braking ratio ($R_{min}$), the control unit 160 may change the first torque map correction factor ($K_D$) to 1 and change the second torque map correction factor ($K_E$) to 0. The control unit 160 may substitute the changed first torque map correction factor ($K_D$) and second torque map correction factor ($K_E$) into the above Equation 1 to calculate a new creep torque. The control unit 160 controls the driving system 130 to convert the calculated creep torque into a new creep torque at the time of starting on of the vehicle so as to be able to convert a driving mode.

According to embodiments of the present disclosure, the control unit 160 may confirm whether the calculated regenerative braking ratio ($R_{R/D}$) is a larger value than a minimum regenerative braking ratio ($R_{min}$) and a smaller value than the maximum regenerative braking ratio ($R_{max}$). When the regenerative braking ratio ($R_{R/D}$) is larger than the minimum regenerative braking ratio ($R_{min}$) and smaller than the maximum regenerative braking ratio ($R_{max}$) the control unit 160 may change the second torque map correction factor ($K_E$) to ($R_{R/D}-R_{min}$)/($R_{max}-R_{min}$) and the first torque map correction factor ($K_D$) to 1–second torque map correction factor ($K_E$). The control unit 160 converts the creep torque calculated at the time of the starting on of the vehicle into a new creep torque and controls the driving system 130 depending on the creep torque so as to be able to convert the driving mode of the vehicle.

In this case, the maximum regenerative braking ratio ($R_{max}$) may be set to be 7% as an average regenerative braking ratio when a vehicle drives an express way and the minimum regenerative braking ratio ($R_{min}$) may be set to be 30% as an average regenerative braking ratio when a vehicle drives the downtown. According to embodiments of the present disclosure, the maximum regenerative braking ratio ($R_{max}$) and the minimum regenerative braking ratio ($R_{min}$) each may be restrictively set to be 7% and 30%, but are only one example and therefore may be changed and set by manufacturers.

Figure 2:
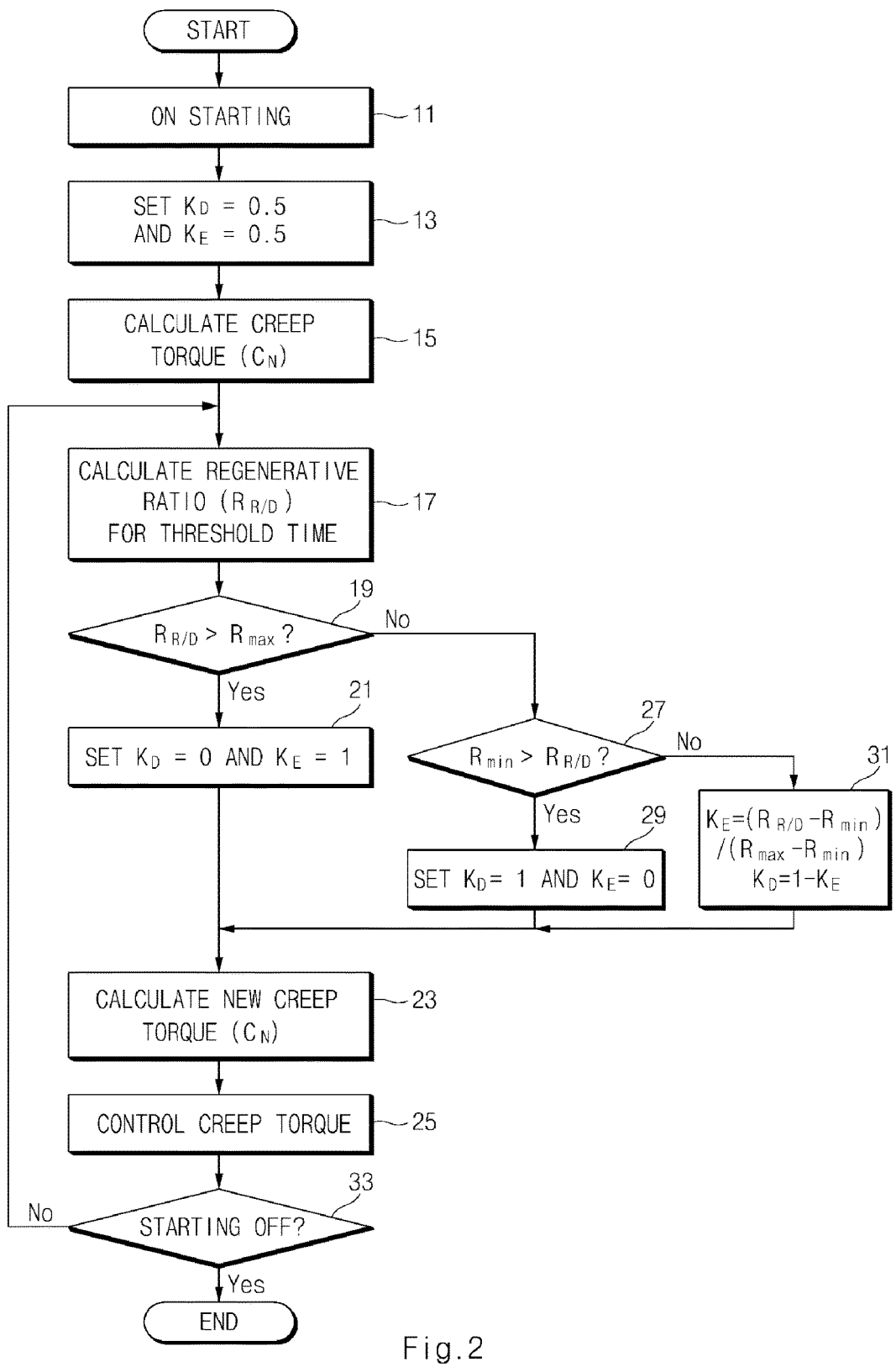
FIG. 2 is a flow chart for describing a method for controlling a creep torque according to embodiments of the present disclosure.

FIG. 2 is a flow chart for describing a method for controlling a creep torque according to embodiments of the present disclosure.

Referring to FIGS. 1 and 2, in step 11, the control unit 160 may sense that the starting of the vehicle becomes on. In step 13, when the starting of the vehicle becomes on, the control unit 160 may set the first torque map correction factor ($K_D$) and the second torque map correction factor ($K_E$), respectively, to be 0.5 based on the driving mode of the vehicle. In step 15, the control unit 160 may calculate the creep torque of the vehicle based on the above Equation 1.

In step 17, the control unit 160 may periodically calculate the regenerative braking ratio ($R_{R/D}$) for the threshold time. According to embodiments of the present disclosure, in step 19, the control unit 160 may determine whether the calculated regenerative braking ratio ($R_{R/D}$) has a larger value than the maximum regenerative braking ratio ($R_{max}$). Based on the determination of step 19, when the regenerative braking ratio ($R_{R/D}$) has a larger value than the maximum regenerative braking ratio ($R_{max}$), the control unit 160 may perform step 21. In step 21, the control unit 160 changes the first torque map correction factor ($K_D$) to 0 and the second torque map correction factor ($K_E$) to 1, and then may perform step 23.

According to embodiments of the present disclosure, in step 19, the control unit 160 may determine whether the calculated regenerative braking ratio ($R_{R/D}$) has a larger value than the maximum regenerative braking ratio ($R_{max}$). Based on the determination of step 19, when the regenerative braking ratio ($R_{R/D}$) has a smaller value than the maximum regenerative braking ratio ($R_{max}$), the control unit 160 may perform step 27. In step 27, when the regenerative braking ratio ($R_{R/D}$) has a smaller value than the minimum regenerative braking ratio ($R_{min}$), the control unit 160 may perform step 29. In step 29, the control unit 160 changes the first torque map correction factor ($K_D$) to 1 and the second torque map correction factor ($K_E$) to 0, and then may perform step 23.

According to embodiments of the present disclosure, in step 27, the control unit 160 may perform step 31 when the regenerative braking ratio ($R_{R/D}$) is larger than the minimum regenerative braking ratio ($R_{min}$). That is, when the regenerative braking ratio ($R_{R/D}$) is larger than the minimum regenerative braking ratio ($R_{min}$) and smaller than the maximum regenerative braking ratio ($R_{max}$), the control unit 160 may perform step 31. In step 31, the control unit 160 may change the second torque map correction factor ($K_E$) to ($R_{R/D}-R_{min}$)/($R_{max}-R_{min}$). The control unit 160 changes the first torque map correction factor ($K_D$) to 1–the second torque map correction factor ($K_E$), and then may perform step 23.

In step 23, the control unit 160 may substitute the changed first torque map correction factor ($K_D$) and second torque map correction factor ($K_E$) into the above Equation 1 to calculate a new creep torque. In step 25, the control unit 160 converts the creep torque calculated in step 15 into the creep torque calculated in step 23 and converts the driving mode of the vehicle by receiving the control request of the driving system 130 based on the converted creep torque.

After converting the creep torque, the control unit 160 may perform step 33. In step 33, when the starting off of the vehicle is not sensed, the control unit 160 may return to step 17 to again perform the above steps. In step 33, when it is sensed that the vehicle has started, the control unit 160 may end the above process to control the creep torque.

As described above, according to embodiments of the present disclosure, the regenerative braking ratio ($R_{R/D}$) is reduced while the vehicle drives at a substantially consistent speed (e.g., on an express way), and thus the creep torque calculated in step 23 may gradually approach the torque map having the small creep torque. Therefore, the creep torque approaches the torque map having the small creep torque while the vehicle drives at a substantially consistent speed in order to reduce a regenerative braking amount.

On the other hand, the regenerative braking ratio ($R_{R/D}$) is increased while the vehicle drives at a substantially inconsistent speed (e.g., through a city downtown), such that the creep torque calculated in step 23 may gradually approach the torque map having the large creep torque. Therefore, the creep torque approaches the torque map having the large creep torque while the vehicle drives at a substantially inconsistent speed in order to increase the regenerative braking amount.

As described above, according to the apparatus and method for controlling a creep torque of a vehicle in accordance with embodiments of the present disclosure, it is possible to improve the performance and energy efficiency of the vehicle by calculating the regenerative braking ratio based on the driving of the vehicle for the threshold time and controlling the creep torque of the vehicle based on the calculated regenerative braking ratio.

The embodiments of the present disclosure disclosed in the present specification and the accompanying drawings have been provided only as specific examples in order to assist in understanding the present disclosure and do not limit the scope of the present disclosure. Therefore, it is to be understood that in addition to the embodiments of the present disclosure described herein, all the changed or modified forms derived from the technical spirit of the present disclosure are included in the scope of the present disclosure.

What is claimed is:

1. An apparatus for controlling a creep torque, comprising:
 a driving system configured to deliver power to one or more wheels equipped in a vehicle; and
 a control unit configured to i) determine a driving mode of the vehicle, ii) calculate a creep torque based on a regenerative braking ratio of the vehicle while driving for a threshold time, and iii) control the driving system based on the calculated creep torque to convert the driving mode,
 wherein the control unit is further configured to change a first torque map correction factor to 1−(the regenerative braking ratio−a minimum regenerative braking ratio)/(a maximum regenerative braking ratio−the minimum regenerative braking ratio) and is further configured to change a second torque map correction factor to (the regenerative braking ratio−the minimum regenerative braking ratio)/(the maximum regenerative braking ratio−the minimum regenerative braking ratio), when the regenerative braking ratio is smaller than the maximum regenerative braking ratio and larger than the minimum regenerative braking ratio.

2. The apparatus according to claim 1, wherein the control unit is further configured to set the first torque map correction factor having a large creep torque and the second torque map correction factor having a small creep torque, respectively, to be 0.5 according to the driving mode when the vehicle is started.

3. The apparatus according to claim 2, wherein the control unit is further configured to compare the regenerative braking ratio to the maximum regenerative braking ratio and to the minimum regenerative braking ratio and is further configured to change the first torque map correction factor and the second torque map correction factor based on the comparison.

4. The apparatus according to claim 3, wherein the control unit is further configured to change the first torque map correction factor to 0 and the second torque map correction factor to 1, when the regenerative braking ratio is larger than the maximum regenerative braking ratio.

5. The apparatus according to claim 3, wherein the control unit is further configured to change the first torque map correction factor to 1 and the second torque map correction factor to 0, when the regenerative braking ratio is smaller than the minimum regenerative braking ratio.

6. The apparatus according to claim 3, wherein the control unit is further configured to periodically calculate the creep torque based on the changed first torque map correction factor and the changed second torque map correction factor.

7. The apparatus according to claim 1, wherein the control unit is further configured to determine the regenerative braking ratio periodically or in real time and updates the creep torque based on the regenerative braking ratio.

8. The apparatus according to claim 1, wherein the vehicle is a green vehicle.

9. A method for controlling a creep torque, comprising:
 determining a driving mode of a vehicle;
 calculating a regenerative braking ratio of the vehicle while driving for a threshold time;
 calculating a creep torque based on the calculated regenerative braking ratio;
 changing a first torque map correction factor and a second torque map correction factor; and
 converting the driving mode of the vehicle based on the calculated creep torque,
 wherein in the changing of the first torque map correction factor and the second torque map correction factor,
 the first torque map correction factor is changed to 1−(the regenerative braking ratio−a minimum regenerative braking ratio)/(a maximum regenerative braking ratio−the minimum regenerative braking ratio), and the second torque map correction factor is change to (the regenerative braking ratio−the minimum regenerative braking ratio)/( the maximum regenerative braking ratio−the minimum regenerative braking ratio), when the regenerative braking ratio is smaller than the maximum regenerative braking ratio and larger than the minimum regenerative braking ratio.

10. The method according to claim 9, further comprising:
 prior to the calculating of the regenerative braking ratio, setting the first torque map correction factor having a large creep torque and the second torque map correction factor having a small creep torque, respectively, to be 0.5 according to the driving mode when the vehicle is started.

11. The method according to claim 10, wherein the calculating of the creep torque further includes:

comparing the regenerative braking ratio to the maximum regenerative braking ratio and the minimum regenerative braking ratio; and changing the first torque map correction factor and the second torque map correction factor based on the comparison, wherein the creep torque is periodically calculated based on the changed first torque map correction factor and the changed second torque map correction factor.

12. The method according to claim 11, wherein in the changing of the first torque map correction factor and the second torque map correction factor, the first torque map correction factor is changed to 0 and the second torque map correction factor is changed to 1, when the regenerative braking ratio is larger than the maximum regenerative braking rate.

13. The method according to claim 11, wherein in the changing of the first torque map correction factor and the second torque map correction factor, the first torque map correction factor is changed to 1 and the second torque map correction factor is changed to 0, when the regenerative braking ratio is smaller than the minimum regenerative braking ratio.

14. The method according to claim 9, wherein the vehicle is a green vehicle.

15. A non-transitory computer readable medium containing program instructions for controlling a creep torque, the computer readable medium comprising:

program instructions that determine a driving mode of a vehicle;

program instructions that calculate a regenerative braking ratio of the vehicle while driving for a threshold time;

program instructions that calculate a creep torque based on the calculated regenerative braking ratio;

program instructions that change a first torque map correction factor and a second torque map correction factor; and program instructions that convert the driving mode of the vehicle based on the calculated creep torque, wherein in the changing of the first torque map correction factor and the second torque map correction factor, the first torque map correction factor is changed to 1−(the regenerative braking ratio−a minimum regenerative braking ratio)/(a maximum regenerative braking ratio−the minimum regenerative braking ratio), and the second torque map correction factor is change to (the regenerative braking ratio−the minimum regenerative braking ratio)/(the maximum regenerative braking ratio−the minimum regenerative braking ratio), when the regenerative braking ratio is smaller than the maximum regenerative braking ratio and larger than the minimum regenerative braking ratio.

* * * * *